(12) United States Patent
North et al.

(10) Patent No.: US 10,755,346 B1
(45) Date of Patent: Aug. 25, 2020

(54) SYSTEM AND METHOD FOR ACCESS TO SAFE DEPOSIT BOX

(71) Applicant: JPMorgan Chase Bank, N.A., New York, NY (US)

(72) Inventors: Brandon North, Upper Arlington, OH (US); Aruna Ramachandra, Westerville, OH (US); James Weaver, Columbus, OH (US); Ramanujam Chari, Dublin, OH (US); Marcia Winslow, Gahanna, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 205 days.

(21) Appl. No.: 15/191,976

(22) Filed: Jun. 24, 2016

Related U.S. Application Data (60) Provisional application No. 62/184,066, filed on Jun. 24, 2015.

(51) Int. Cl.
*G06Q 40/00* (2012.01)
*G06Q 40/02* (2012.01)
*H04L 29/06* (2006.01)
*G06F 16/2455* (2019.01)

(52) U.S. Cl.
CPC ......... *G06Q 40/02* (2013.01); *G06F 16/2455* (2019.01); *H04L 63/08* (2013.01)

(58) Field of Classification Search
CPC .................................................... G06Q 40/00
USPC .......................................................... 705/35
See application file for complete search history.

(56) References Cited

U.S. PATENT DOCUMENTS

| 6,695,204 B1 * | 2/2004 | Stinson ............ G06Q 20/40145 |
| | | 235/379 |
| 2006/0181392 A1 * | 8/2006 | Watson .............. G07C 9/00912 |
| | | 340/5.73 |
| 2007/0256615 A1 * | 11/2007 | Delgrosso ................. E05G 1/08 |
| | | 109/38 |

\* cited by examiner

*Primary Examiner* — Ojo O Oyebisi
(74) *Attorney, Agent, or Firm* — Greenblum & Bernstein, P.L.C.

(57) ABSTRACT

A system and method are provided for electronically logging and controlling access to a safe deposit box at a financial institution. The system and method allow for detailed logs of an attempt, denial, or grant of access to a safe deposit box. The system and method also allow for notifications to be sent to all authorized users of any attempt, denial, or grant of access to a safe deposit box.

16 Claims, 8 Drawing Sheets

SYSTEM AND METHOD FOR ACCESS TO SAFE DEPOSIT BOX

RELATED APPLICATIONS

The present invention claims priority to U.S. Provisional Patent Application No. 62/184,066, filed Jun. 24, 2015, which is incorporated herein by reference in its entirety.

FIELD OF THE INVENTION

The present invention relates generally to accessing a safe deposit box, and more particularly, to a system and method for electronically logging and allowing fast and secure access to a safe deposit box in a banking system.

BACKGROUND OF THE INVENTION

Safe deposit boxes are often used to store any tangible product from personal documents to collectibles and family heirlooms. The objects that can be stored in a safe deposit box are limitless, subject to any restrictions of the financial institution where the safe deposit box is stored.

However, accessing a safe deposit box is currently a complicated and antiquated process. First, a bank employee must check the identification of a safe deposit box renter. Second, the authorized renter must sign a signature card. Third, the authorized renter must provide a key to the safe deposit box, which, when used in conjunction with the bank's key, allows for access to the renter's safe deposit box. This three step control system is used to ensure only authorized persons have access to the safe deposit box. The bank records the signature of any individual allowed to enter the box.

However, often times where a hold exists on a safe deposit box, the bank employee authorizing access to the safe deposit box is unaware of the hold at the time of requested access. Therefore, a renter who should not have access to his/her safe deposit box, for any reason, is still impermissibly able to access his/her safe deposit box. A financial institution may discover the hold after the safe deposit box has already been accessed because the current access steps do not include a query of the user's associated financial account or holds. On the other hand, where a bank employee is required to determine whether a hold exists, he/she may have to call a team or manually query a database for any holds.

Additionally, where multiple renters are authorized to access the same safe deposit box, it is impossible for each of those authorized to know when the safe deposit box was accessed unless the multiple renters accessed the box together, or a renter reviews the signature card upon his/her next attempt at accessing his/her safe deposit box.

Other problems and drawbacks also exist.

BRIEF SUMMARY OF THE INVENTION

Embodiments of the invention are drawn to a server-based banking system and method for electronically logging and controlling access to a safe deposit box. In embodiments of the invention the system includes a user interface that accepts a credential, a transmission engine for transmitting the credential over a network, an account database for storing the financial account information of an account holder at a bank, a financial processor for verifying access to a safe deposit box, a user access engine for logging a user's attempt at accessing a safe deposit box, and a notification engine for notifying all authorized users of a safe deposit box of any attempted, granted, or denied access. In embodiments of the invention, the method includes the steps of receiving a credential by a user seeking access to a safe deposit box, transmitting the credential over a network, retrieving stored information of a user's account at a financial institution from an account database, verifying access to the safe deposit box at the financial institution using the financial account processor, logging an attempted, granted, or denied access with the access engine, and notifying all authorized users of a safe deposit box of any attempted, granted, or denied access using a notification engine.

DETAILED DESCRIPTION OF PREFERRED EMBODIMENTS

Embodiments of the present invention are directed to a system and method for accessing a safe deposit box.

Figure 1:
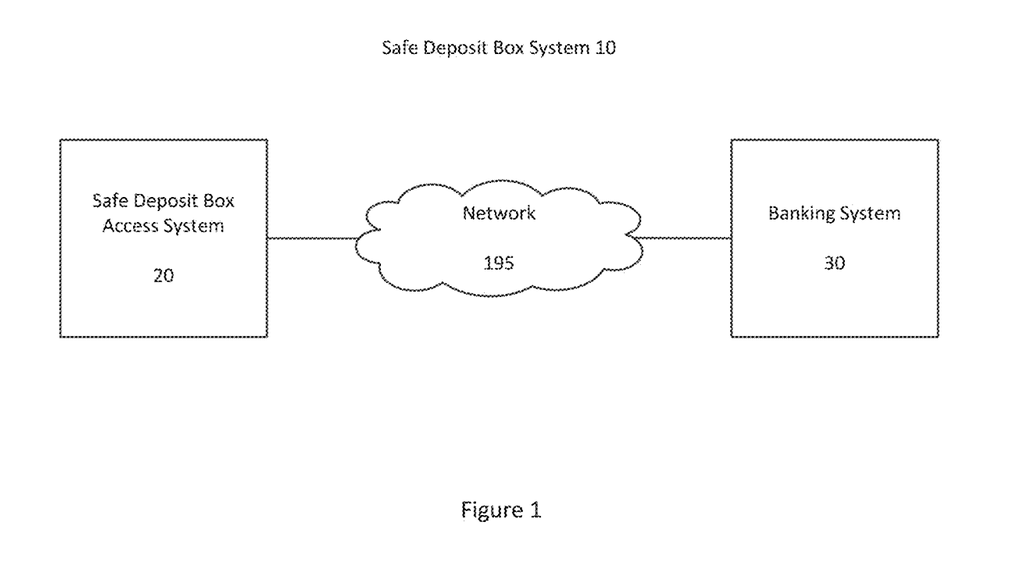
FIG. 1. is a block diagram illustrating a Safe Deposit Box system in accordance with an embodiment of the invention.

FIG. 1 is a block diagram illustrating a server-based Safe Deposit Box System 10 for accessing and logging access to a safe deposit box in accordance with an embodiment of the invention. The Safe Deposit Box System 10 includes a Safe Deposit Box Access System 20. The Safe Deposit Box Access System 20 is connected through a communications medium over a network 195, such as for example, but not limited to, the Internet, an Intranet, a local-area-network (LAN), a wide-area-network (WAN), etc., to one or more Banking System(s) 30.

The network 195 is preferably the Internet, but may be or include other types of networks. The network 195 may include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system via the user-input interface, or other appropriate mechanisms. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Figure 2:
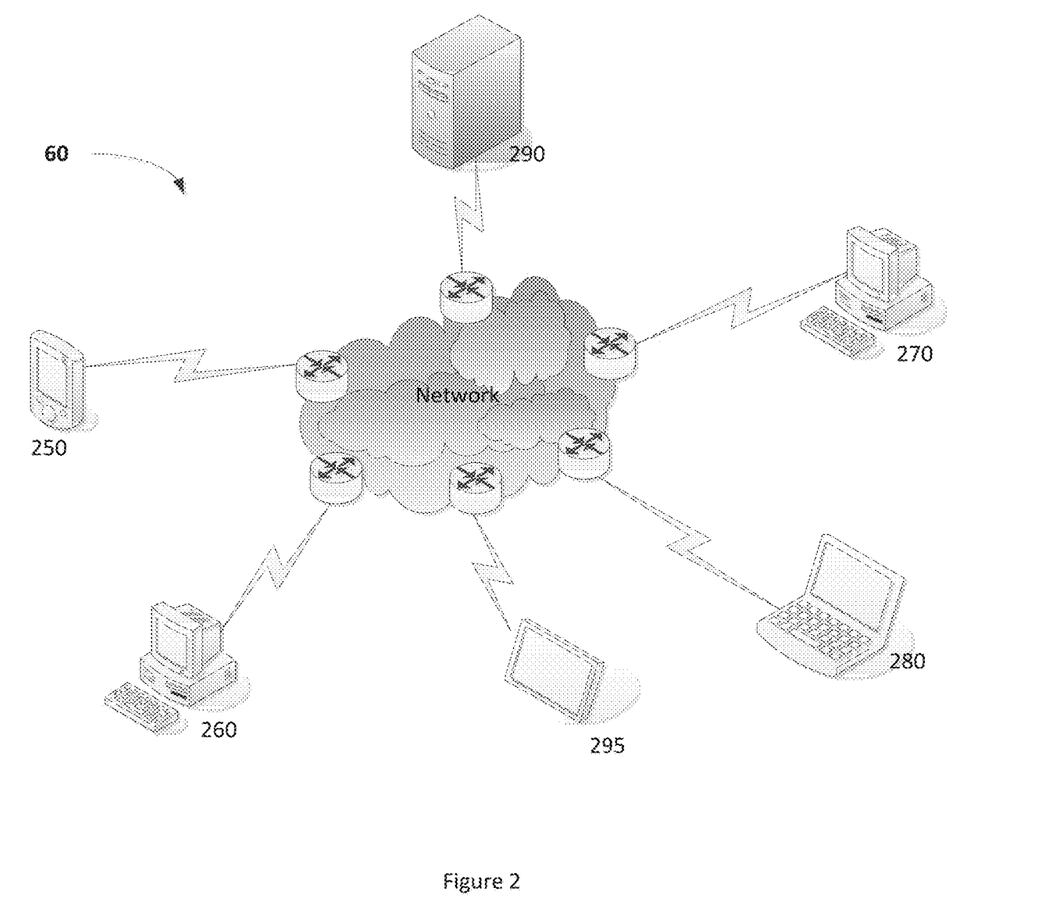
FIG. 2. is a block diagram illustrating an operating environment in accordance with an embodiment of the invention.

FIG. 2 is a block diagram illustrating an operating environment for a Safe Deposit Box System 10 in accordance with an embodiment of the invention. Those skilled in the art will appreciate that the invention may be practiced with various computer system configurations, including handheld wireless devices such as mobile phones, smart phones or Personal Digital Assistants (PDAs) 250, multiprocessor systems 260, microprocessor-based or programmable consumer electronics 270, minicomputers 280, mainframe computers 290, Tablets (iPad™, Samsung Galaxy™, etc.) 295, and the like. The invention may also be practiced in distributed computing environments where tasks are performed by remote processing devices that are linked through a communications network. In a distributed computing environment, program modules may be located in both local and remote computer storage media including memory storage devices.

Figure 3:
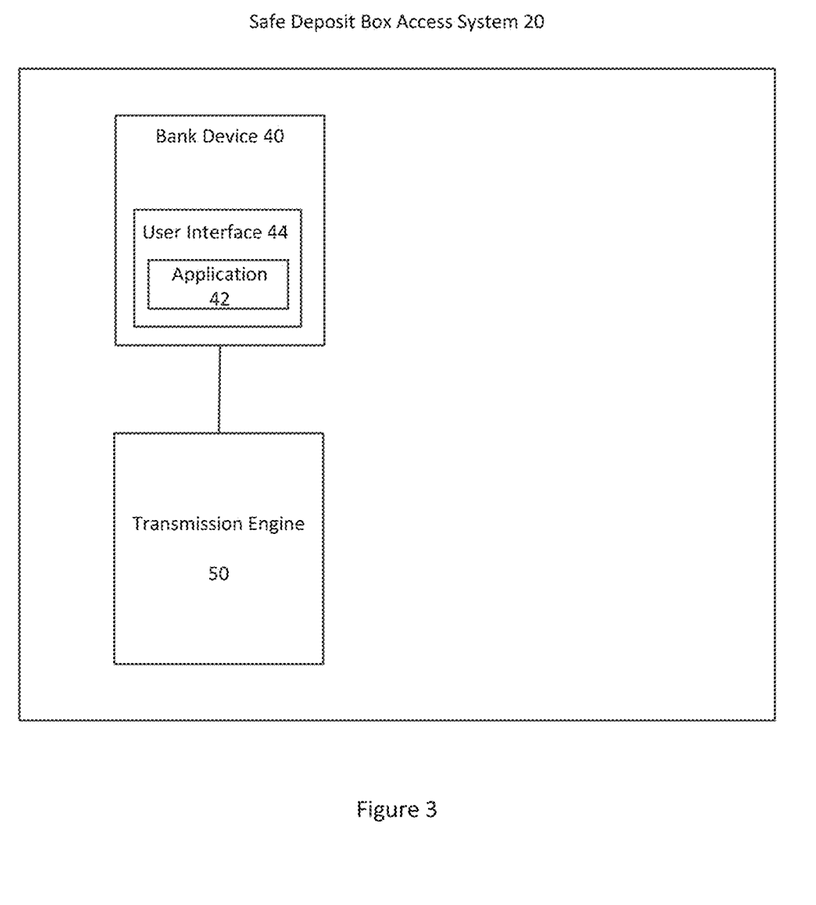
FIG. 3 is a block diagram illustrating an exemplary embodiment of a Safe Deposit Box Access system.

FIG. 3 is an exemplary embodiment of a Safe Deposit Box Access System 20. The Safe Deposit Box Access System 20 has a bank device 40 with a user interface 44 and an application 42, and a transmission engine 50. Non-limiting examples of bank devices include various computer system configurations, including hand-held wireless devices such as mobile phones, smart phones or Personal Digital Assistants (PDAs), multiprocessor systems, microprocessor-based or programmable consumer electronics, minicomputers, mainframe computers, Tablets (iPad™, Samsung Galaxy™, etc.), etc. The bank device 40 with the user interface 44 and application 42 will accept a user's credential. The credential may be any sort of identifying code, for example, but not limited to, a pin number, passcode, or password. The credential will be transmitted via the transmission engine 50 over the network 195 to the banking system 30.

Figure 4:
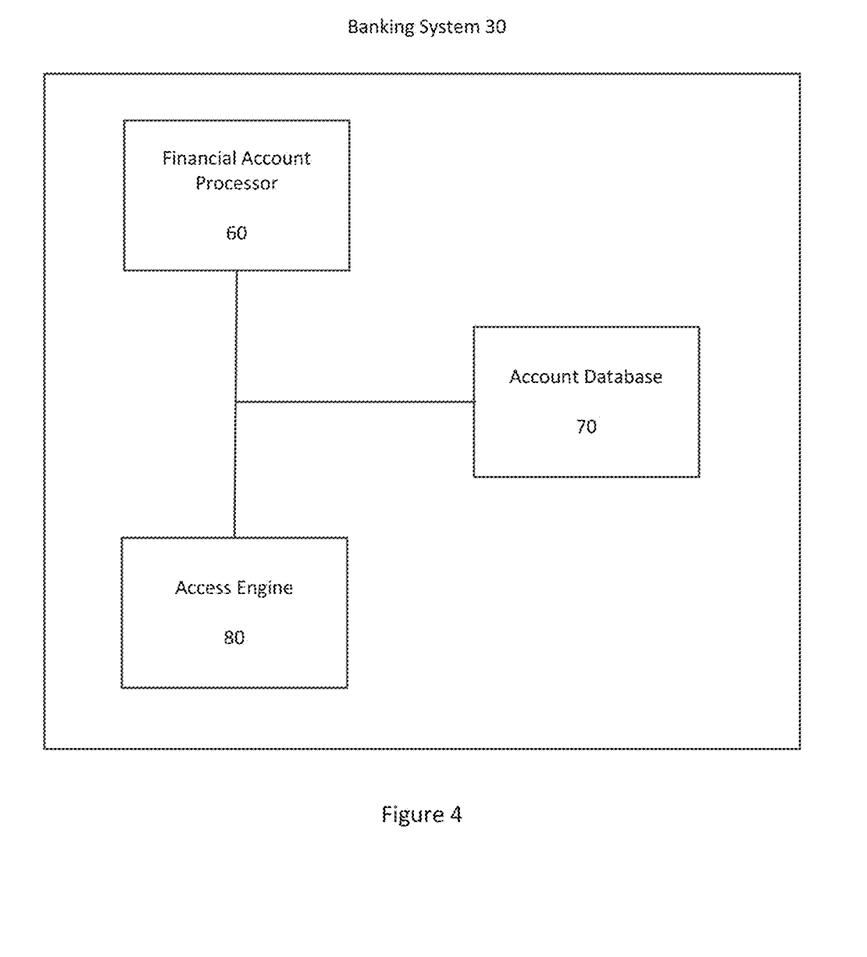
FIG. 4 is a block diagram illustrating an exemplary embodiment of a Banking system.

FIG. 4 is an exemplary embodiment of a Banking System 30. The Banking System 30 has a financial account processor 60, a user access engine 80, and an account database 70. The transmitted credential queries the financial account processor 60 to verify access to the safe deposit box. Verification may be based on accessing the user's account information stored in the account database 70. The account database 70 may store the account information of one or more of a user's accounts at a financial institution. The account database 70 is stored in a nontransitory computer memory. These accounts may be, by way of non-limiting example, one or more savings accounts, checking accounts, and/or accounts associated with a safe deposit box. In embodiments of the invention, a hold or other information associated with a user's account in the account database 70 may prevent access to the safe deposit box. A person of ordinary skill in the art would understand the reasons behind which a user's account may have a hold. For example, one of ordinary skill in the art would readily understand that reasons for an account hold may include, but not limited to, a deposit of a particularly large check, an out-of-state check, or a foreign check, funds that were pledged as collateral for a loan, an order by a court or a Federal or State tax authority that would result in a hold, a financial institution's investigation of suspicious activity in an account, a customer's reporting that he or she was a victim of identity theft, etc. If a hold exists, an alert may populate on the bank device 40. In other embodiments of the invention, an incorrect credential or attempted access by an unauthorized user would prevent access to the safe deposit box. The user access engine 80 transmits the grant or denial of access to the safe deposit box data to the bank device 40. In embodiments of the invention, the user access engine 80 may log the access request, and the grant or denial of access to the safe deposit box. The user access engine 80 may log any information affiliated with the query of access. By way of non-limiting example, the user access engine 80 may log the bank employee that was operating the bank device, the user attempting to access the safe deposit box, the location of the safe deposit box, and/or the time of access. The logged information may be stored with a user's account information in the account database 70. A person of ordinary skill in the art would understand the various data and metrics that may be logged as affiliated with a request of access to a safe deposit box.

Figure 5:
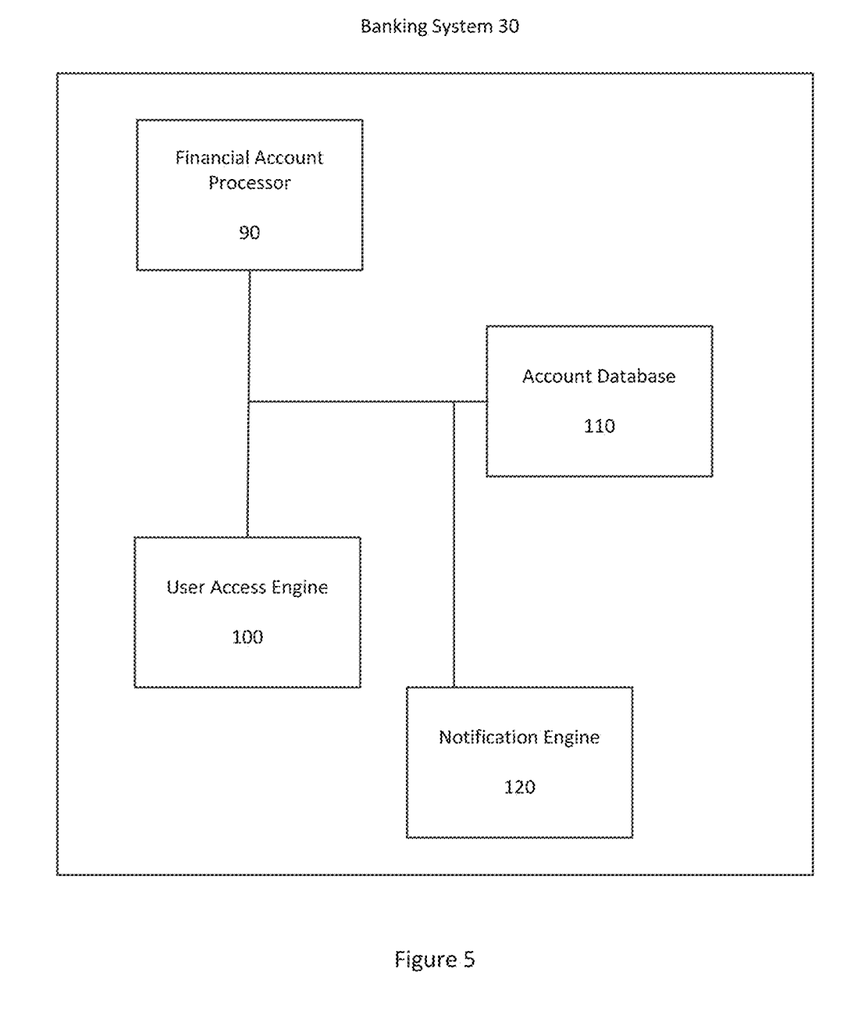
FIG. 5 is a block diagram illustrating an alternative exemplary embodiment of a Banking system.

FIG. 5 is an exemplary embodiment of a Banking System 30. System 30 has a financial account processor 90, a user access engine 100, an account database 110, and a notification engine 120. The transmitted credential queries the financial account processor 90 to verify access to the safe deposit box. Verification may be based on accessing the user's account information stored in the account database 110. The account database 110 may store the account information of one or more of a user's accounts at a financial institution. The account database 110 is stored in a nontransitory computer memory. These accounts may be, by way of non-limiting example, one or more savings accounts, checking accounts, and/or accounts associated with a safe deposit box. In embodiments of the invention, a hold or other information associated with a user's account in the account database 110 may prevent access to the safe deposit box. A person of ordinary skill in the art would understand the reasons behind which a user's account may have a hold. If a hold exists, an alert may populate on the bank device 40. In other embodiments of the invention, an incorrect credential or attempted access by an unauthorized user would prevent access the safe deposit box. The user access engine 100 transmits the grant or denial of access to the safe deposit box data to the bank device 40. In embodiments of the invention, the user access engine 100 may log the access request, and the grant or denial of access to the safe deposit box. The user access engine 100 may log any information affiliated with the query of access. By way of non-limiting example, the user access engine 100 may log the bank employee that was operating the bank device, the location of the safe deposit box, the user attempting to access the safe deposit box, and/or the time of access. The logged information may be stored with a user's account information in the account database 110. A person of ordinary skill in the art would understand the various data and metrics that may be logged as affiliated with a request of access to a safe deposit box.

The notification engine 120 may notify all authorized users of a safe deposit box of any or all the information transmitted by the user access engine 100. In embodiments of the invention, the authorized user of a safe deposit box may choose the information they are notified of via the notification engine 120. In alternative embodiments of the invention, the financial institution may choose the types of information a user receives via the notification engine 120. The notification engine 120 may notify the user via for example, but not limited to, electronic mail message, an application message service, a short message service, a postal letter, an update to an account message center, or the financial institution's application on the user's computer system, including hand-held wireless devices, as described herein. In embodiments of the invention, the notification engine sends a pop-up alert to the bank device 40.

Figure 6:
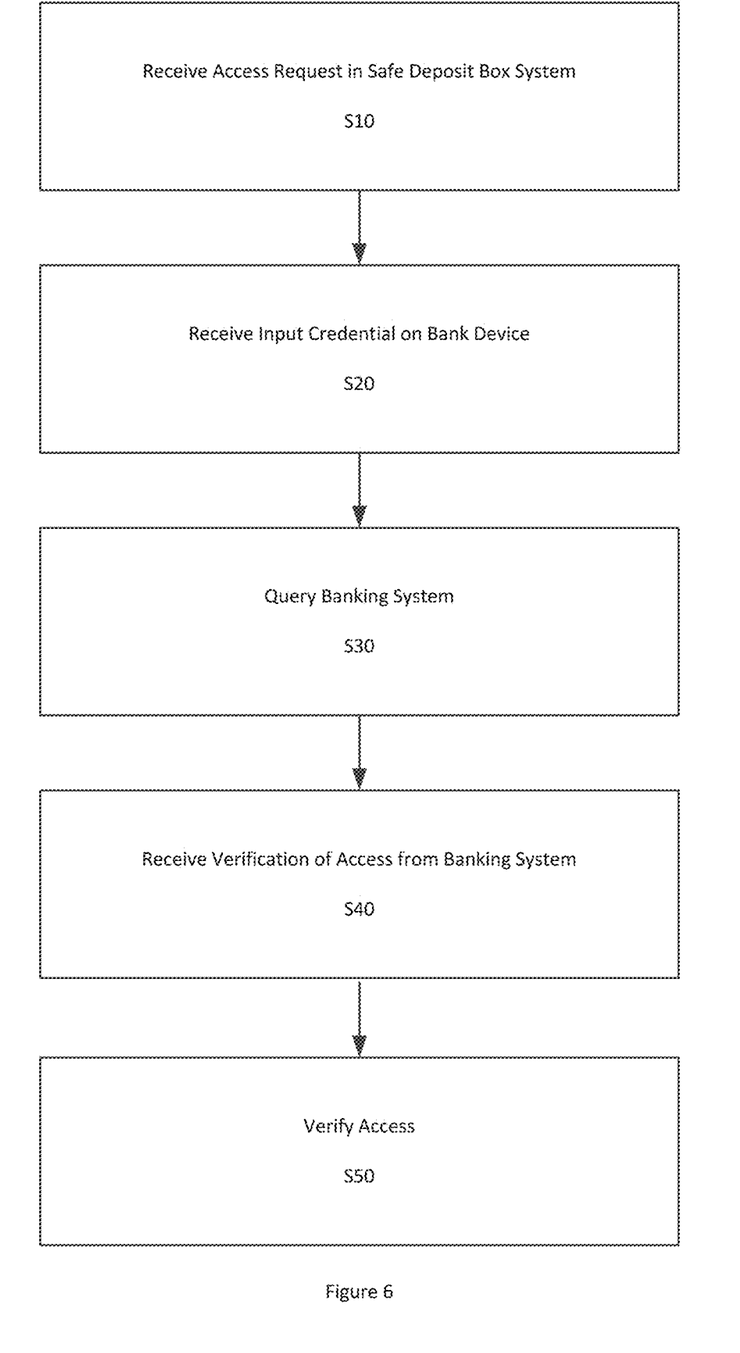
FIG. 6 is a process flow diagram in accordance with an embodiment of the invention.

FIG. 6 is a flow diagram illustrating flow of data between components in accordance with an exemplary embodiment of the invention. The financial institution receives a request to access a safe deposit box by a user in S10. Once access is requested by the user in S10, a bank employee receives a credential on a bank device by the user seeking access to the safe deposit box in S20. The bank device queries the banking system in S30 to determine if the user seeking access should be granted or denied access, as described herein. The bank device then receives verification of a grant or denial of access from the banking system in S40, and the bank employee either grants or denies access to the safe deposit box in S50.

Figure 7:
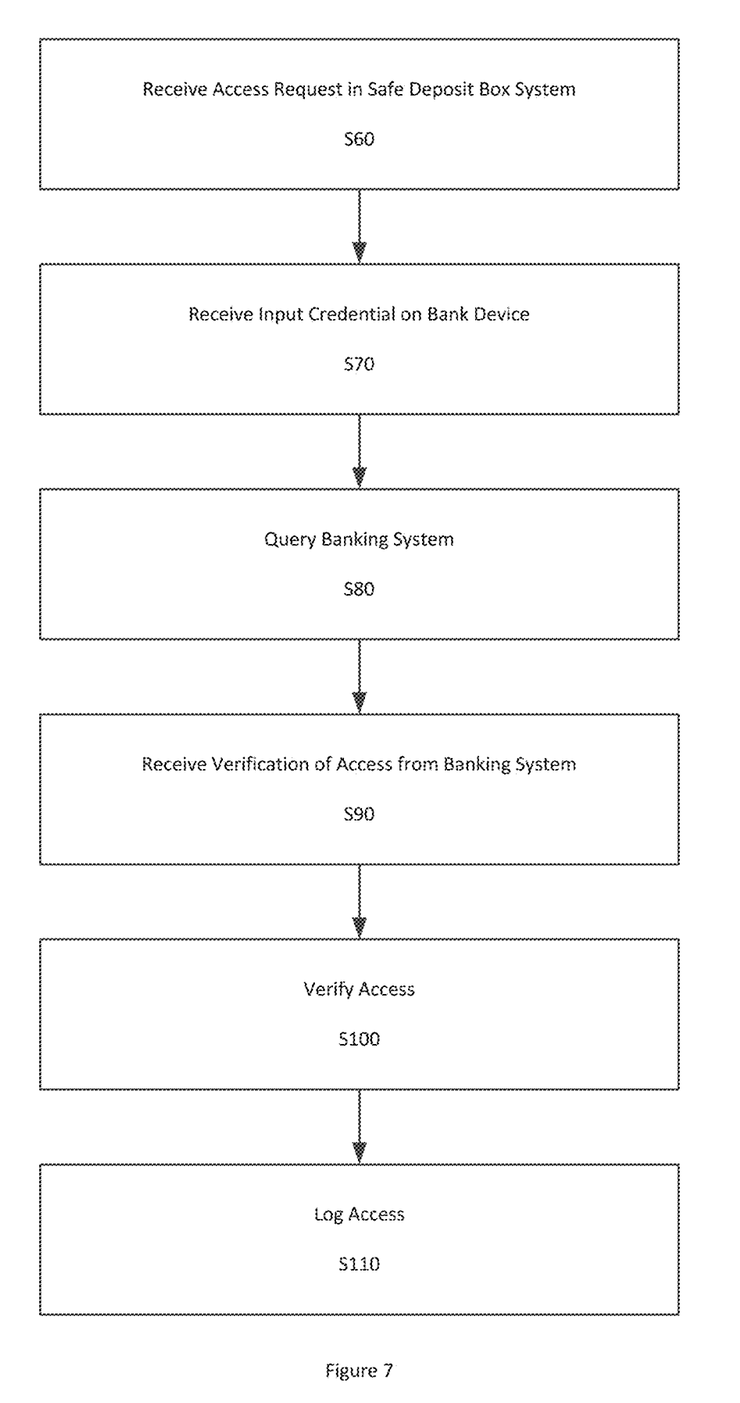
FIG. 7 is a process flow diagram in accordance with an alternative embodiment of the invention.

FIG. 7 is a flow diagram illustrating flow of data between components in accordance with another exemplary embodiment of the invention. The financial institution receives a request to access a safe deposit box by a user in S60. Once access is requested by the user in S60, a bank employee receives a credential on a bank device by the user seeking access to the safe deposit box in S70. The bank device queries the banking system in S80 to determine if the user seeking access should be granted or denied access. The bank device then receives verification of a grant or denial of access from the banking system in S90, and the bank employee either grants or denies access to the safe deposit box in S100. The attempted access and/or the outcome may then be logged in S110. In embodiments of the invention, only a successful grant of access to the safe deposit box may be logged. In alternative embodiments of the invention, only a denial of access to the safe deposit box may be logged.

Figure 8:
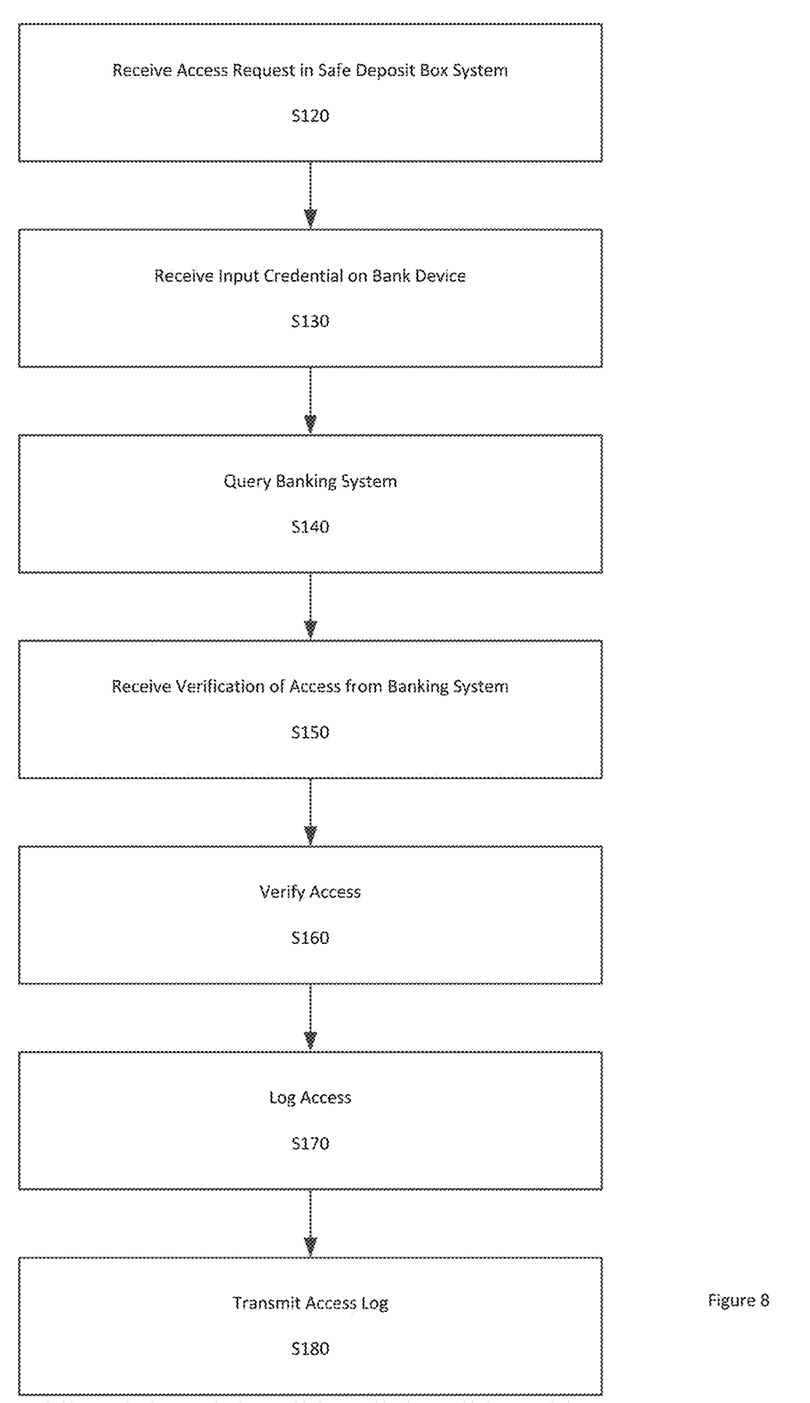
FIG. 8 is a process flow diagram in accordance with an alternative embodiment of the invention.

FIG. 8 is a flow diagram illustrating flow of data between components in accordance with an alternative exemplary embodiment of the invention. The financial institution receives a request to access a safe deposit box by a user in S120. Once access is requested by the user in S120, a bank employee receives a credential on a bank device by the user seeking access to the safe deposit box in S130. The bank device queries the banking system in S140 to determine if the user seeking access should be granted or denied access. The bank device then receives verification of a grant or denial of access from the banking system in S150, and the bank employee either grants or denies access to the safe deposit box in S160. The attempted access and/or the outcome may then be logged in S170. In embodiments of the invention, only a successful grant of access to the safe deposit box may be logged. In alternative embodiments of the invention, only a denial of access to the safe deposit box may be logged. The access log may be transmitted to a user in S180. By way of non-limiting example, transmission may occur via electronic mail message, an application message service, a short message service, a postal letter, an update to an account message center, or the financial institution's application on the user's computer system, including handheld wireless devices, as described herein.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

As described above, embodiments of the system and processes of the invention are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the one or more processors and/or the memories may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A server-based system for electronically logging and controlling access to a safe deposit box, the system comprising:
   a user interface displayed on a computing device, wherein a user inputs a credential to access a safe deposit box at a financial institution, wherein the credential is a form of identification verification of the user managed by the financial institution;
   a transmission engine in communication with the computing device, for transmitting the credential over a network;
   a non-transitory computing memory including an account database for storing account information of the user at the financial institution, wherein the account database stores hold information, different than the credential, associated with the account information that restricts access to the safe deposit box even if the credential is correct;
   a processor configured to:
     receive the transmitted credential;
     access the account database;
     verify that the hold information stored in the account database is associated with the account information; and
     send a message to a user access engine regarding verification of the hold information,
   wherein the user access engine receives the message along with the hold information from the processor and communicates the message to a bank device based on the hold information.

2. The system of claim 1, wherein the processor verifies access to the safe deposit box based on an identity of a financial account of the user at the financial institution.

3. The system of claim 1, wherein the user interface further comprises an application.

4. The system of claim 1, wherein the user access engine electronically logs the user's attempt to access the safe deposit box at the financial institution.

5. The system of claim 4, further comprising a notification engine that notifies the user of information stored by the user access engine.

6. The system of claim 1, wherein the credential is any one of the following identification code: a pin number, a passcode, and a password.

7. The system of claim 1, wherein the credential is transmitted via Bluetooth, a wireless network, a satellite network, or a cellular network.

8. A method for electronically logging and controlling access to a safe deposit box, the method comprising:
   receiving a credential, on a user interface displayed on a computing device, from a user seeking access to a safe deposit box at a financial institution, wherein the credential is a form of identification verification of the user managed by the financial institution;
   transmitting, via a transmission engine, the credential over a network;
   receiving the transmitted credential by a processor;
   retrieving, by the processor, stored information of a user's account at the financial institution from an account database stored in a non-transitory computer memory, wherein the account database stores hold information, different than the credential, associated with the account information that restricts access to the safe deposit box even if the credential is correct;
   verifying, by the processor, that the hold information stored in the account database is associated with the account information;
   sending, by the processor, a message to a user access engine regarding verification of the hold information;
   receiving, by the user access engine, the message along with the hold information from the processor; and
   communicating, by the user access engine, the message to a bank device based on the hold information.

9. The method of claim 8, wherein the processor verifies access to the safe deposit box based on an identity of a financial account of the user at the financial institution.

10. The method of claim 8, wherein the user interface further comprises an application.

11. The method of claim 8, further comprising: electronically logging the user's attempt to access the safe deposit box at the financial institution using the user access engine.

12. The method of claim 11, further comprising: notifying the user of information stored by the user access engine using a notification engine.

13. The method of claim 8, wherein the credential is any one of the following identification code: a pin number, a passcode, and a password.

14. The method of claim 8, wherein the credential is transmitted via Bluetooth, a wireless network, a satellite network, or a cellular network.

15. The system of claim 1, wherein the bank device is configured to display a pop-up message comprising a grant message or a denial message.

16. The method of claim 8, further comprising: displaying, by the bank device, a pop-up message comprising a grant message or a denial message.

* * * * *